Apr. 10, 1923.　　　　　　　　　　　　　　　　1,451,201
　　　　　　　A. T. BROWN ET AL
　AIR COOLED INTERNAL COMBUSTION ENGINE AND ELECTRIC GENERATOR PLANT
　　　　　　　Filed Feb. 18, 1919　　　　4 sheets-sheet 1

INVENTORS
BY
ATTORNEYS.

Apr. 10, 1923.
A. T. BROWN ET AL
1,451,201
AIR COOLED INTERNAL COMBUSTION ENGINE AND ELECTRIC GENERATOR PLANT
Filed Feb. 18, 1919
4 sheets-sheet 2
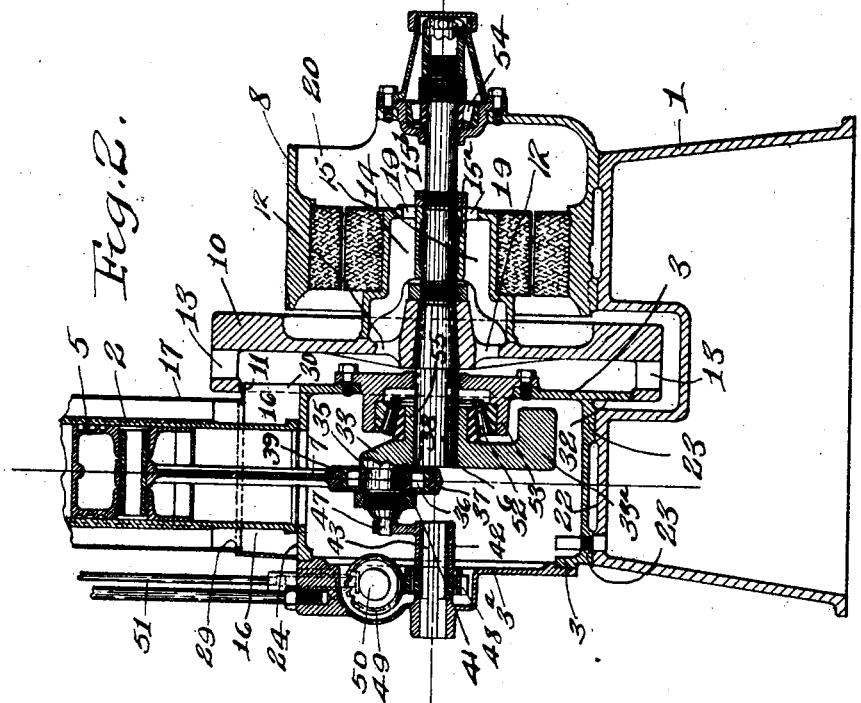
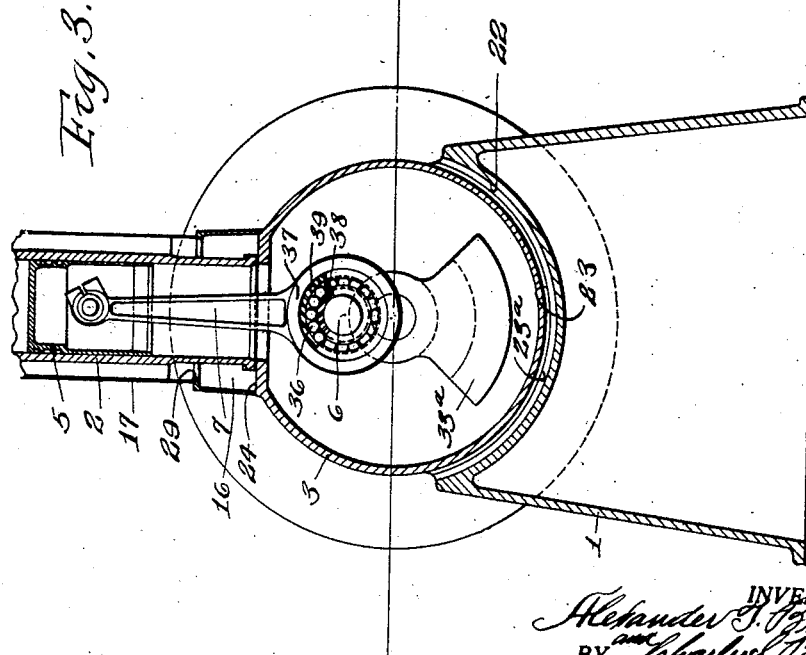
INVENTORS
Alexander T. Brown
and Charles E. Brown
BY Parsons & Bridell
ATTORNEYS.

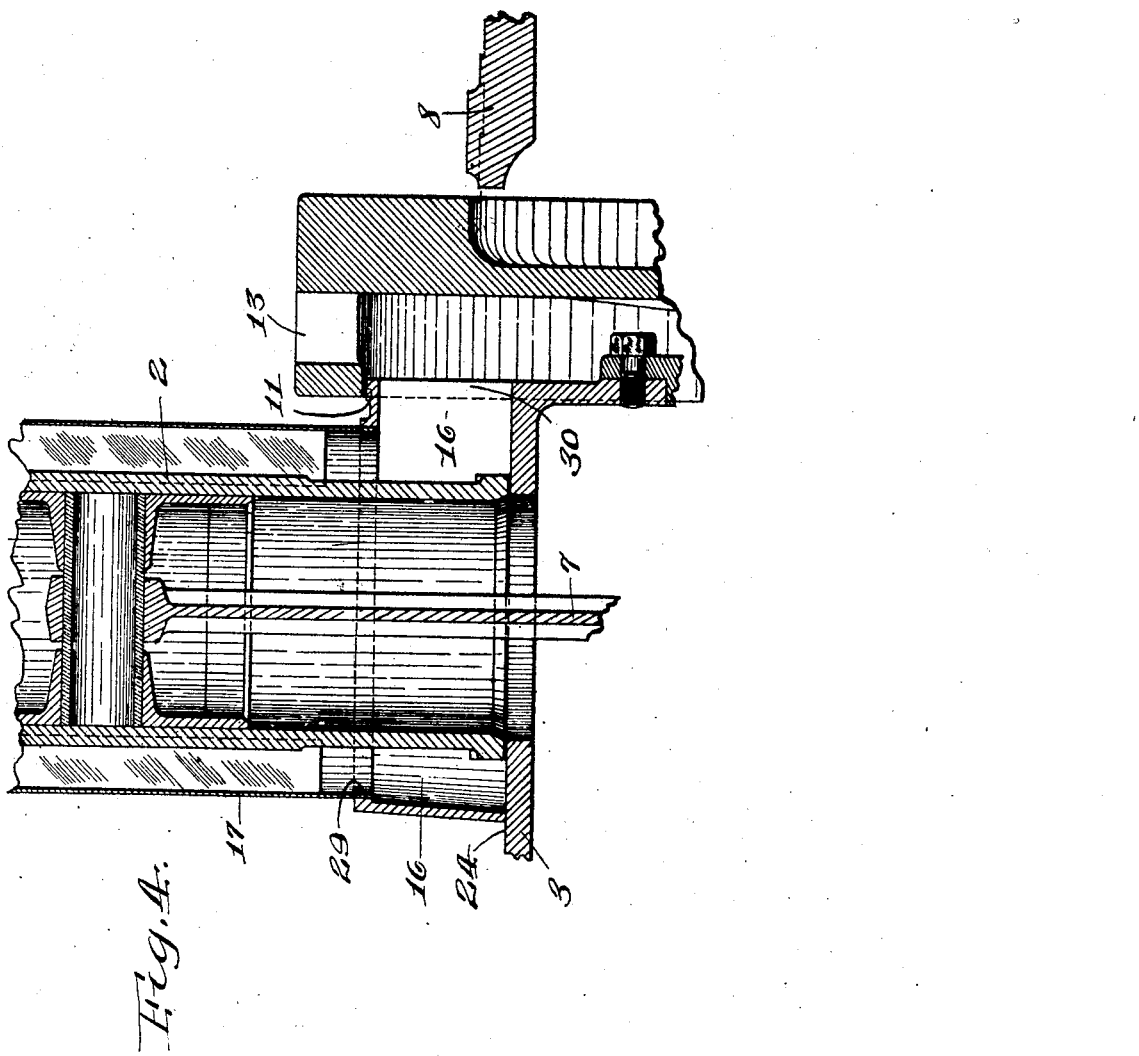

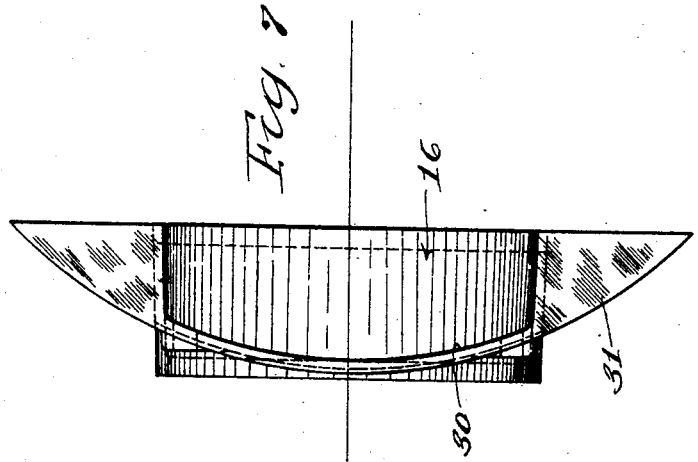
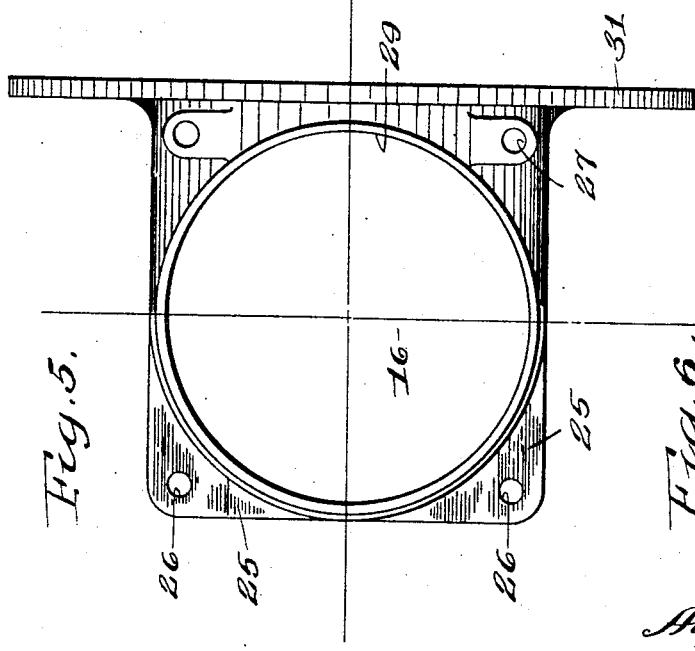
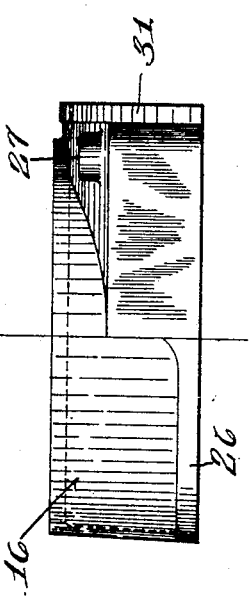

Patented Apr. 10, 1923.

1,451,201

UNITED STATES PATENT OFFICE.

ALEXANDER T. BROWN AND CHARLES S. BROWN, OF SYRACUSE, NEW YORK.

AIR-COOLED INTERNAL-COMBUSTION ENGINE AND ELECTRIC GENERATOR PLANT.

Application filed February 18, 1919. Serial No. 277,374.

*To all whom it may concern:*

Be it known that we, ALEXANDER T. BROWN and CHARLES S. BROWN, citizens of the United States, and residents of Syracuse, in the county of Onondaga and State of New York, have invented a certain new and useful Air-Cooled Internal-Combustion Engine and Electric Generator Plant, of which the following is a specification.

This invention relates to power plants including an internal combustion engine and an electric generator driven directly thereby and has for its object a particularly simple and efficient arrangement of the engine and generator. Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 2 is a vertical sectional view, partly broken away, thereof.

Figure 3 is a sectional view taken at a right angle to Figure 2.

Figure 4 is an enlarged fragmentary sectional view of the lower end of the cylinder and the contiguous parts of the fly wheel and generator casing.

Figure 5 is a plan view of the air chamber around the base of the cylinder.

Figures 6 and 7 are respectively, elevations taken at a right angle to each other of the air chamber.

Figure 1:
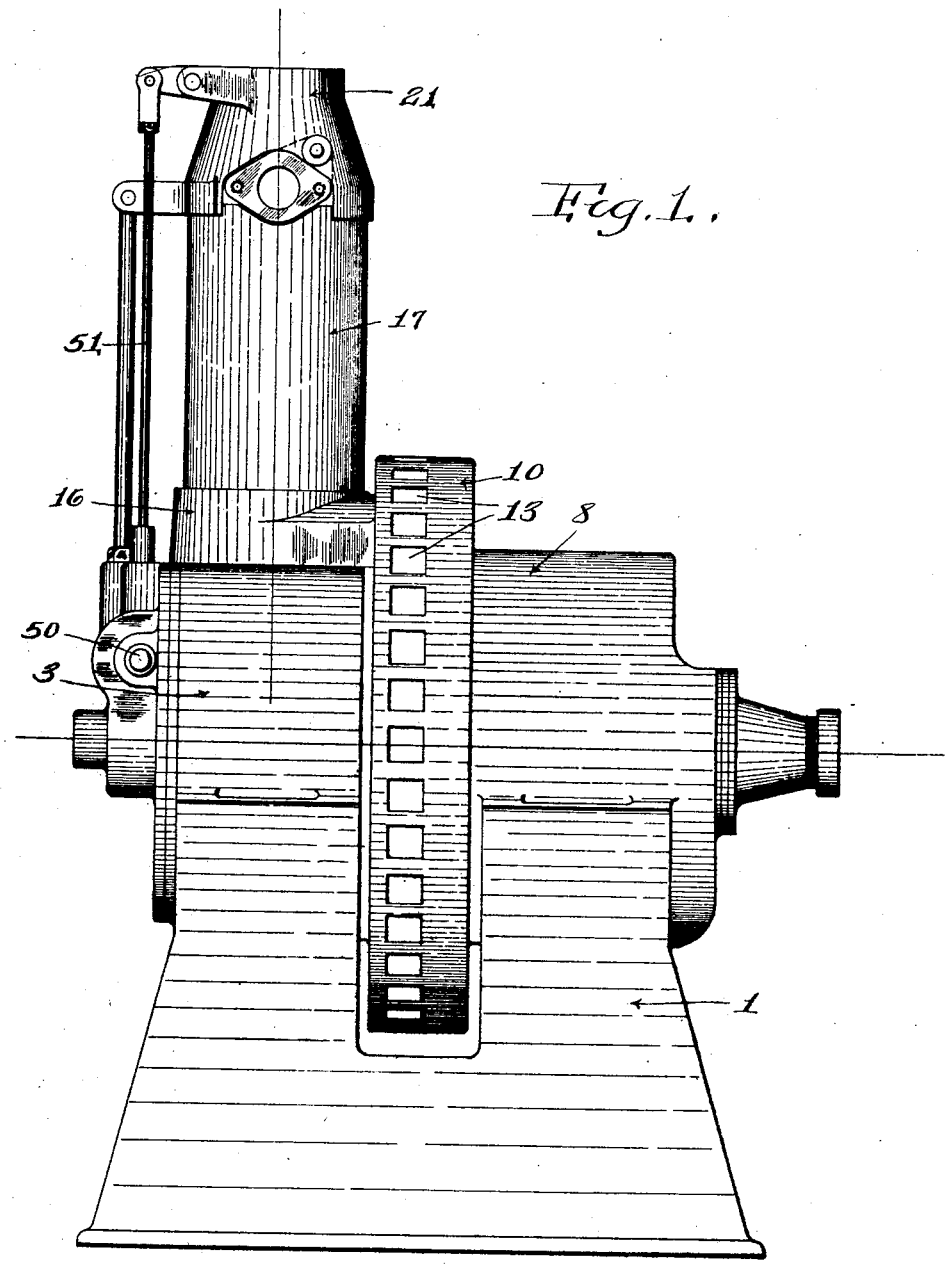
Figure 1 is a side elevation of a power plant embodying our invention.

This power plant comprises generally, an air cooled internal combustion engine, a jacket enclosing the cylinder, an air chamber at the base of the jacket having a laterally extending outlet, and a fan mounted on the engine shaft and movable across said outlet with its intake adjacent said outlet.

1 designates the base of the power plant; 2 the cylinder of the internal combustion engine, 3 the base or crank case which is mounted upon the base 1. 5 is the piston movable in the cylinder, 6 the crank shaft and 7 the connecting rod between the piston 5 and the crank shaft. The cylinder is bolted to the crank casing in any suitable manner.

8 is the casing of the electric generator, the casing being also mounted upon the base 1 concentric with the shaft 6 which extends axially through the casing. An armature is mounted on the shaft within the casing 8.

The means for circulating air downwardly along the cylinder 2 and inwardly through the generator casing 8 comprises a centrifugal fan which is here shown as a part of a fly wheel 10 mounted on the shaft 6 between the crank case 3 and the generator casing 8, the fly wheel having air inlets 11, 12 on opposite sides thereof and peripheral outlets 13. The fly wheel is formed with radial fins or webs 14 in advance of the inlet 12 and within the tubular support 15 for the windings of the armature, the fins facilitating the circulation or drawing in of air through said support 15. The inlet 11 communicates with the chamber 16 surrounding the lower end of the cylinder 2 which chamber communicates with a jacket or sleeve 17 encircling the cylinder 2. The air inlet 12 communicates with a central hub or support 15 of the armature which rotates with the shaft 6. The hub 15 is provided with inlets 19 at its end remote from the fly wheel 10, which inlets open into the casing 8, and as the casing is made up of open frame work, that is open at its outer end 20 the air is drawn during the rotation of the fly wheel through the casing 8, passage 19, hub 15, fan intake 12 and is discharged through the peripheral outlets 13 of the fan. Air is also drawn in between the casing 8 and the fly wheel and thence through the passage 19. During the rotation of the fly wheel, air is also drawn downwardly through the jacket 17, chamber 16, into the inlet 11 of the fly wheel and is discharged through the outlets 13. Hence, owing to the arrangement of the fly wheel both the engine and the generator are kept cool. The hub 15 is formed with a bearing 15ª on the shaft 6 and is held in position and clamped against the fly wheel by a nut 15ᵇ threading on the shaft 6 against the outer end of the hub 15.

As here shown, the cylinder is provided with a cap 21 at its upper end which supports the valve mechanism of the engine and directs the air about the head of the cylinder and the valves therein. The construction of this cap 21 forms no part of this invention.

The air chamber is a box mounted on the flat upper face 24 of the crank casing and is provided with a base flange 25 provided with bolt holes 26 and also with additional bolt holes 27 through which screw bolts are passed into holes 28 in the top of the crank casing. The air chamber 16 is open on its lower side and rests on the top of the crank case and is formed with a circular opening 29 in its top of greater diameter than the cylinder 2 providing an annular passage around the cylinder through which the air current passes from the jacket 17 into the chamber 16. The jacket 17 encloses heat radiating fins 18 on the cylinder and fits at its lower end into the opening 29. The chamber or box 16 is formed with a laterally extending outlet passage 30 alined with inlets 11 of the fan and with external flanges 31 located in the fan and having an arc shaped outer edge conforming to the inner curve of the rim of the fan and closing the upper portion of the fan against the entrance of outside air, the remainder of the entrance 11 of the fan is closed against the entrance of outside air by a flange 32 on the crank casing, the flanges 31, 32 being continuations of each other.

In assembling, the cylinder 2 is bolted on the crank case 3, the chamber or box 16 is then placed over the cylinder 2 and on the crank case 3 and moved to the right, Fig. 4 so that the outlet 30 enters the inlet 11 of the fan, and then bolted in position. The sleeve or jacket 17 is then placed in position.

The crank shaft 6 is provided with a crank arm 33 within the casing 3 and the crank arm 33 is formed with a crank pin 35 on which the connecting rod 7 is mounted, the pin 35 being fixed at one end to the crank and having its other end free. Antifriction bearing 36 is interposed between the ring 37 of the bearing of the connecting rod 7 and the crank pin 35, the use of antifriction bearings at this point being made possible by the fact that the crank is single instead of double so that the ring 37 can be passed over the end of the crank pin 35. The antifriction bearing consists of inner and outer rings 38, 39 and rollers between the rings, the inner ring 39 abutting against an annular shoulder 40 on the crank arm and being held in position by a nut 41 threading on the crank pin 35.

The crank shaft 6 is journaled in suitable antifriction bearings 52 arranged within the internal hub 53 of the crank case and also in antifriction bearings 54 carried by the outer wall of the generator casing 8, the bearings 52 and 54 being conical.

The crank 33 and its counterweight 33ª are formed with a tubular hub 55 mounted on the inner end of the crank shaft 6 and the bearings 54 are interposed between said hub and the hub 53 which is provided on a detachable check piece 56 secured to the end wall of the crank case in any suitable manner as by cap screws 57. Owing to the arrangement of the crank shaft 6 and crank thereon, the parts can be readily assembled in the crank case and in the generator case.

What we claim is:

1. In an internal combustion engine, a crank case, a cylinder mounted on the case, a crank shaft journaled in the case, an air chamber in the form of a box mounted on the crank case around and spaced apart from the lower end of the cylinder, the chamber being open at one side, a fan mounted on the crank shaft and passing across said outlet, the chamber having flanges formed with arc-shaped edges located near the rim of the fan and conforming to the curve thereof, substantially as and for the purpose described.

2. In an internal combustion engine, a crank case, a cylinder mounted on the case, a crank shaft journaled in the case, an air chamber in the form of a box mounted on the crank case around and spaced apart from the lower end of the cylinder, the chamber being open at one side, a fan mounted on the crank shaft and running across said outlet, the chamber having flanges formed with arc-shaped edges located near the rim of the fan and conforming to the curve thereof, and the crank casing having a flange located in the side of the fan forming a continuation of the former flange, substantially as and for the purpose specified.

3. In an internal combustion engine, a crank case, a cylinder mounted on the case, an air chamber in the form of a box mounted on the crank case, around and spaced apart from the lower end of the engine cylinder, the chamber having an outlet in one side, a jacket surrounding the cylinder having its lower end engaged with the top of the air chamber, and a fan mounted on the crank shaft and running across said outlet and having an inlet communicating with the outlet of said chamber, substantially as and for the purpose set forth.

In testimony whereof, we have hereunto signed our names at Syracuse, in the county of Onondaga, and State of New York, this 10th day of February, 1919.

ALEXANDER T. BROWN.
CHAS. S. BROWN.